Dec. 20, 1960 W. T. HARRIS 2,964,837

METHOD OF TRANSDUCER MANUFACTURE

Filed June 9, 1958

INVENTOR
WILBUR T. HARRIS
BY
Mitchell & Bechert
ATTORNEYS

United States Patent Office 2,964,837

Patented Dec. 20, 1960

2,964,837

METHOD OF TRANSDUCER MANUFACTURE

Wilbur T. Harris, Southbury, Conn., assignor to The Harris Transducer Corporation, Woodbury, Conn., a corporation of Connecticut Filed June 9, 1958, Ser. No. 740,931

4 Claims. (Cl. 29—155.58)

This invention relates to magnetostrictive transducers and more particularly to their assembly and manufacture.

In many magnetostrictive transducer applications, maximum efficiency of energy transfer occurs when the energy is transmitted from the transducer to the utilization medium in a longitudinal direction with little transfer in a transverse direction. Thus, maximum energy transfer is obtained when all the members comprising the transducer are aligned longitudinally with a minimum of lateral skewing in any of the members.

It is accordingly an object of the invention to provide a method for manufacturing and assembling magnetostrictive transducers in which the alignment of the elements of the transducer is carefully controlled.

It is another object of the invention to provide a process for the manufacture of transducer assemblies in which the transducers have similar properties and efficiencies.

It is a further object of the invention to provide a process for manufacturing and assembling magnetostrictive transducers which insures structural stability and ruggedness in the final product.

It is a feature of the invention to bond a magnetostrictive member to non-magnetic end members, the bonding material being a thermosetting material and the coefficient of expansion of the terminal members being greater than that of the magnetostrictive member.

Other objects and various other features of novelty and invention will be pointed out or will occur to those skilled in the art from a reading of the following specification in conjunction with the accompanying drawings. In said drawings, which show forth for illustrative purposes only, preferred forms of the invention.

In accordance with an aspect of the invention, there is provided a method of assembling a transducer including a magnetostrictive member and opposite non-magnetic terminal members; each terminal member having a socketed end, and a coefficient of expansion greater than that of the magnetostrictive member. The method comprises positioning the opposite end of the magnetostrictive member in the socketed end of the respective terminal members, one of which contains a thermosetting bonding material. The magnetostrictive member is aligned relative to said terminal members and while aligned, heated until the thermosetting bonding material solidifies.

The unbonded terminal member is then removed and a quantity of bonding material is applied to the socket, and the magnetostrictive member reinserted. The members are again aligned and heated, until the bonding material solidifies. The assembly is then cooled and, as a result of the greater expansion of the terminal members during the heat treatment, the resultant contraction produces an extremely rigid and rugged bond between the terminal and magnetostrictive members.

Figure 1:
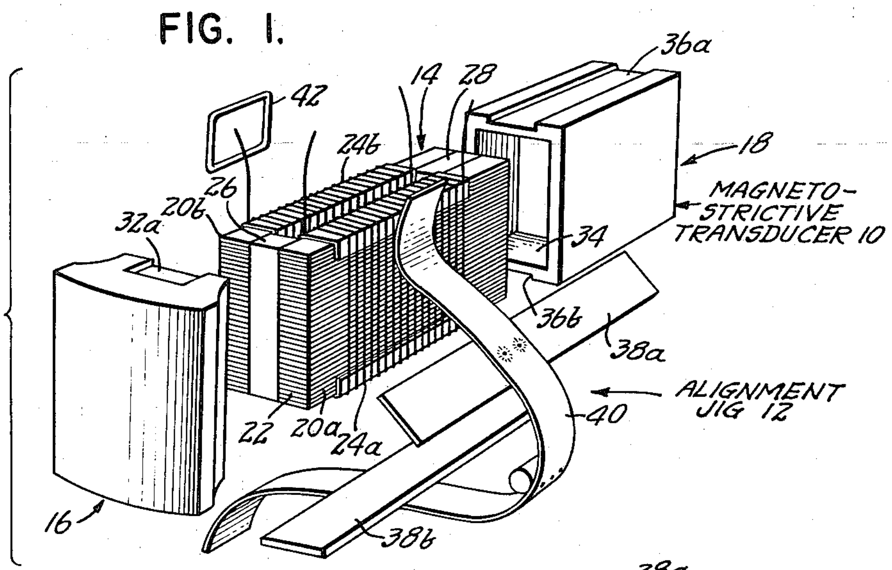
Figure 1 is an exploded view of a magnetostrictive transducer and an alignment jig in accordance with one aspect of the invention.

Referring to Figure 1, a magnetostrictive transducer 10 is shown comprising a magnetostrictive member 14, a head member 16 and a tail member 18. The magnetostrictive member 14 is formed by developing a pair of stacks **20*a* and 20*b* of rectangular laminae of magnetostrictive material such as nickel. Preformed windings 24*a* and 24*b* are respectively slid over the stacks 20*a* and 20*b*. A coupling spacer 26 of a ferromagnetic material such as one of the commercially available ferrites is positioned between the stacks 20*a*, 20*b* to provide a low reluctance path between corresponding stack ends. At the other end of the stacks 20*a*, 20*b*, a magnetic spacer 28 is inserted. The magnetic spacer 28 serves to complete the magnetic circuit, and establishes a permanent magnetic bias in the magnetostrictive member. To insure a more linear distribution of the permanent magnetic field in the stacks 20*a*, 20*b*, the coupling spacer 26 may also be a permanent magnet, oriented to reinforce the magnetic field established by the magnetic spacer 28**.

After the above stated elements are bonded together by a bonding material such as, for example, an epoxy resin, they are ready for final assembly with the head member 16 and the tail member 18. The head member 16, which contacts the medium to be excited, is fabricated from a non-magnetic material such as aluminum. One end of the head member 16 has a socket 30 to accommodate an end 22 of the magnetostrictive member 14 (see Figure 3). Grooves **32*a* are formed in the top and bottom sides of the head member 16; only the groove in the top member being shown. The width of grooves 32*a*—36*a* may be substantially equal to the thickness of the coupling spacer 26 and the magnetic spacer 28**.

Similarly, one end of the tail member 18 (fabricated from a non-magnetic material such as zinc) has a socket 34 to accommodate the other end of the magnetostrictive member 14. Corresponding grooves 36(*a*—*b*) are formed in the top and bottom sides of the tail member 18.

In assembling the several component parts, a thermosetting bonding agent such as epoxy resin is first introduced into the socket 34 of the tail member 18, socket 34 being upwardly facing to receive and contain the resin. One end of the wound stacks including the coupler or magnet is positioned in the socket 34, while the other end is positioned in the socket 30 of the head member 16 to form an assembly; at this stage, socket 30 serves only a locating function and contains no resin. The jig rods 38(*a*—*b*) riveted to the hinged strap 40 of the alignment jig 12 are fitted into the grooves of the head and tail members. In particular, the top jig rod **38*a* is accommodated by the groove 32*a* of the head member 16 and the groove 36*a* of the tail member 18, while the bottom jig rod 38*b* is accommodated by corresponding grooves in the bottom sides of the head and tail members to porvide longitudinal axial alignment. Finally, the clamp 42 is fitted over the strap 40 and the alignment jig 12** is locked to prevent any possible lateral movement of the members.

In the first bonding step, the entire assembly is upended and rested on the end of the tail member 18 to permit possible settling of the magnetostrictive member 14 in the socket 34, and to assure filling of any voids. The assembly is heated in this position until the thermosetting bonding agent solidifies. Since the coefficient of expansion of the zinc tail member 18 is greater than the coefficient of expansion of the nickel magnetostrictive member 14, the contraction which results from subsequent cooling of the assembly produces a combined bonded and clamped type fastening of head and tail members.

After the assembly is cooled, the alignment jig 12 is unclamped and the head member 16 removed from the assembly. Thermosetting bonding material is then applied to the socket 30 of the head member 16, the socket 30 being then upwardly facing to receive and contain the bonding material. The assembly is reformed by inserting the free end of the magnetostrictive member 14 into the socket 30 of the head member 16. Alignment is reestablished by engaging the jig rods 38(*a*—*b*) into their mating grooves. By keeping the assembly upended and resting it on the free end of the head member 16, another settling and void filling operation is performed. Heat is reapplied to the assembly, and since the aluminum of the head member 16 expands more than the nickel of the magnetostrictive member 14, a rigid bonded fit is established between the head member 16 and the magnetostrictive member 14 when the assembly has cooled. Since the metals and thermosetting bonding material are sufficiently elastic to withstand thermal stresses, no deleterious strains are introduced.

In the above discussion, the magnetostrictive member 14 was described as being first bonded to the tail member 18. Obviously, the sequence of bonding the members 16 and 18 is immaterial.

It should be further noted that although a specific form of alignment jig has been disclosed, most any alignment jig which will conveniently permit the longitudinal alignment of the three members is suitable. The main function of the alignment jig is to prevent any lateral movement and consequent displacement of the head, tail and magnetostrictive members.

Figures 2, 3:
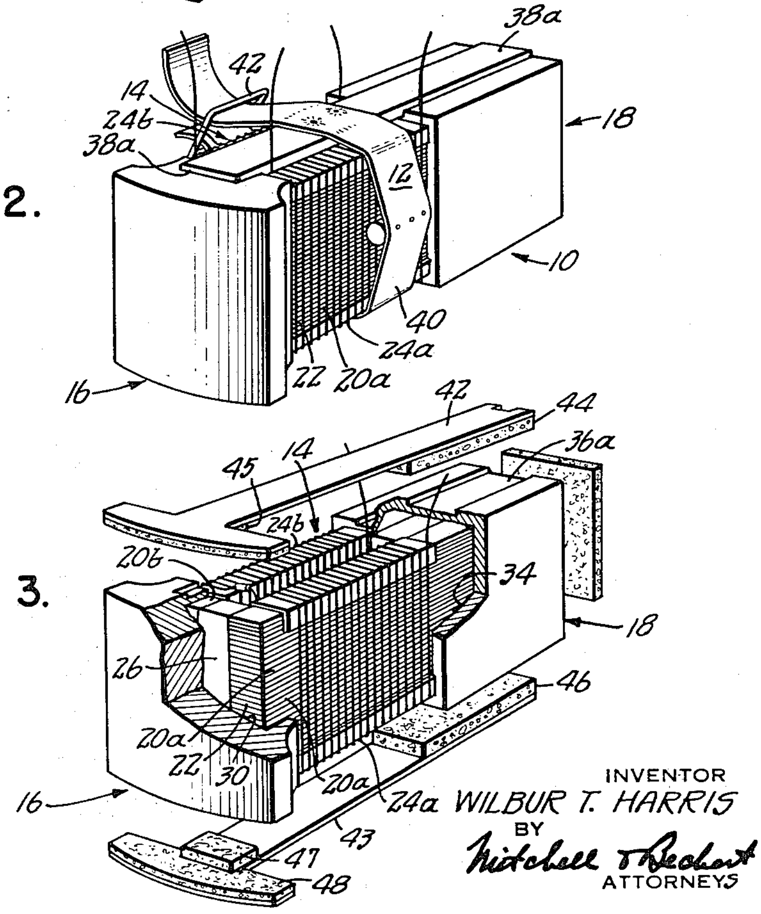
Figure 2 is a perspective view of the assembled magnetostrictive transducer with the alignment jig in position.
Figure 3 shows in greater detail the magnetostrictive transducer.

Referring to Figure 3, the transducer is shown with non-magnetic, alignment and spacer bars 42, 43. In one application of the transducer, multiple units are employed in a circular array; the transducer extending radially, and also in vertical banks. When arranged vertically, the aligned units are spaced from each other by the bars 42, 43 and a similarly shaped metal spacer (not shown).

Each of the bars 42, 43 also serves to position the magnetostrictive member securely in an assembly. The contacting surfaces of the bars 42, 43 are provided with cork keys 44, 45 and 46, 47 respectively, which fit snugly in the grooves 36*a*, 32*a* and 36*b* and the groove at the underside of the head 16, not shown. The bars are substantially in the shape of a T, the cross-bar of the T being positioned on the terminal head of the unit. A cork layer 48 is provided on the contacting surface of the cross-bar. The thickness of the cork keys 44, 45, 46 and 47 is proportionately greater so that the bars nest evenly on the opposed surfaces of the transducer.

There has thus been shown and described a transducer of unique construction, and a method of manufacturing and assembling the transducer which provides for exact alignment of the magnetostrictive members. The method is precisely reproducible, and highly efficient for assembling magnetostrictive transducers which have great structural stability and ruggedness.

While I have described the invention in detail for a preferred method and a preferred construction, it will be understood that modifications may be made without departing from the scope of the invention as defined in the claims which follow.

I claim:

1. A method of assembling a transducer including a magnetostrictive member and opposite non-magnetic terminal members, each having a socketed end, and a coefficient of expansion greater than that of said magnetostrictive member, said method comprising positioning one end of said magnetostrictive member in the socket of a first terminal member, said socket containing a thermosetting bonding material, positioning the opposite end of said magnetostrictive member in the socket of a second terminal member to form an assembly, maintaining a given alignment of the magnetostrictive member within said terminal members while heating the assembly to solidify said thermosetting bonding material, removing said second terminal member from said magnetostrictive member, applying thermosetting bonding material to the socket of said second terminal member, repositioning and aligning said magnetostrictive member in the socket of said second terminal member to reform the assembly, reheating the assembly to solidify the thermosetting bonding material in the socket of said second terminal member, and permitting the assembly to cool, whereby as a result of the greater expansion of the terminal members during heating thereof, the contraction which occurs on subsequent cooling produces a combined bonding and clamping action between the terminal and magneto-strictive members.

2. The method according to claim 1, and further comprising positioning the magnetostrictive member above the respective terminal members after said bonding material is applied to said sockets, but prior to the heating thereof, and leaving the magnetostrictive member free to move downwardly into the socket therebelow, whereby during heating the bonding material fills any voids between the socket and the magnetostrictive member, and also permits settling of the magnetostrictive member in the sockets.

3. A method of assembling a transducer which includes a magnetostrictive member, a first and second non-magnetic terminal member, each having a socketed end and a slotted side, the method comprising introducing a liquid thermosetting bonding material into the socketed end of said first terminal member, positioning one end of the magnetostrictive member in the socketed end of said first terminal member, positioning the opposite end of the magnetostrictive member in the socketed end of said second terminal member, the terminal members being positioned so that the slots are aligned, engaging a jig in said slots to maintain the alignment of said terminal members relative to said magnetostrictive member, resting the assembly on the first terminal member, and heating the assembly until the thermosetting bonding material solidifies, disengaging the jig, removing the second terminal member from the magnetostrictive member, introducing liquid thermosetting bonding material into the socketed end of said second terminal member, repositioning the magnetostrictive member in the socketed end of said second terminal member, reengaging the jig in said slots, resting the reformed assembly on the second terminal member, and reheating the assembly until the thermosetting bonding material in the socket of the second terminal member solidifies.

4. A method of manufacturing a magnetostrictive transducer, comprising forming first and second stacks of laminae of magnetostrictive material, developing first and second windings, positioning said first and second windings around said first and second stacks respectively, forming a head member with a socketed end and a pair of grooves on opposite sides thereof, forming a tail member with a socketed end and a corresponding pair of grooved sides, introducing a thermosetting bonding liquid in the socket of said tail member, positioning said stacks side-by-side, interposing ferromagnetic coupling spacers between the opposite ends of said stacks to form a magnetostrictive member and mounting one end of said member in the socket of said tail member, positioning the other end of said magnetostrictive member in the socket of said head member to form an assembly, engaging a pair of jig bars in the corresponding grooved sides of said head and tail members for aligning said members, resting said assembly on the tail member end, heating the assembly until the thermosetting bonding liquid solidifies, disengaging said pair of jig rods, removing said head member, introducing thermosetting bonding liquid in the socket of said head member, repositioning the free end of said magnetostrictive member in the socketed end of said head member, reengaging said pair of jig rods, resting said assembly on the head member, and again heating said assembly until the thermosetting bonding liquid solidifies.

References Cited in the file of this patent

UNITED STATES PATENTS

| | | |
|---|---|---|
| 567,250 | Moody | Sept. 8, 1896 |
| 2,116,522 | Kunze | May 10, 1938 |
| 2,439,499 | Williams et al. | Apr. 13, 1948 |
| 2,464,568 | Flynn et al. | Mar. 15, 1949 |
| 2,636,998 | Davis et al. | Apr. 28, 1953 |
| 2,680,285 | Furnas | June 8, 1954 |
| 2,751,191 | MacDonald et al. | Aug. 9, 1955 |
| 2,842,689 | Harris | July 8, 1958 |
| 2,842,834 | Macchione | July 15, 1958 |
| 2,871,548 | Pisani | Feb. 3, 1959 |

FOREIGN PATENTS

| | | |
|---|---|---|
| 778,392 | Great Britain | July 3, 1957 |